United States Patent
Gagov et al.

(10) Patent No.: US 12,430,189 B2
(45) Date of Patent: Sep. 30, 2025

(54) SYSTEM AND METHOD FOR SERVICE DISRUPTION ANALYSIS

(71) Applicant: SAP SE, Walldorf (DE)

(72) Inventors: Aleksandar Gospodinov Gagov, Sofia (BG); Svetoslav Dimitrov Milkov, Sofia (BG); Nikolay Feodorov Kitanov, Sofia (BG); Georgi Veselinov Georgiev, Sofia (BG)

(73) Assignee: SAP SE, Walldorf (DE)

( * ) Notice: Subject to any disclaimer, the term of this patent is extended or adjusted under 35 U.S.C. 154(b) by 55 days.

(21) Appl. No.: 18/510,934

(22) Filed: Nov. 16, 2023

(65) Prior Publication Data

US 2025/0165322 A1  May 22, 2025

(51) Int. Cl.
*G06F 11/07* (2006.01)
*G06F 9/451* (2018.01)

(52) U.S. Cl.
CPC .......... *G06F 11/0712* (2013.01); *G06F 9/453* (2018.02)

(58) Field of Classification Search
CPC .... G06F 9/453; G06F 11/079; G06F 11/0793; G06F 11/2252; G06F 11/2257; G06F 11/321; G05B 23/0275; G05B 23/0278
See application file for complete search history.

(56) References Cited

U.S. PATENT DOCUMENTS

| | | | | |
|---|---|---|---|---|
| 5,983,364 A | * | 11/1999 | Bortcosh | G06F 11/2257 714/25 |
| 6,546,506 B1 | * | 4/2003 | Lewis | G06Q 10/06 717/124 |
| 6,615,240 B1 | * | 9/2003 | Sullivan | G06F 9/453 709/205 |
| 2005/0010416 A1 | * | 1/2005 | Anderson | G16H 40/63 704/271 |
| 2005/0102569 A1 | * | 5/2005 | Wu | G06F 11/2257 714/25 |
| 2006/0106796 A1 | * | 5/2006 | Venkataraman | G05B 23/0275 |
| 2008/0034060 A1 | * | 2/2008 | Fisher | G06Q 10/10 709/218 |
| 2009/0150812 A1 | * | 6/2009 | Baker | G16H 40/63 715/764 |
| 2010/0077008 A1 | * | 3/2010 | Davis | G06F 16/93 707/E17.014 |
| 2010/0218030 A1 | * | 8/2010 | Bhatnagar | G06F 11/0706 714/39 |

(Continued)

*Primary Examiner* — Gabriel Chu
(74) *Attorney, Agent, or Firm* — Buckley, Maschoff & Talwalkar LLC

(57) ABSTRACT

According to some embodiments, systems and methods are provided including a memory storing processor-executable program code; and a processing unit to execute the processor-executable program code to cause the system to: receive a service disruption notification for a service; identify a service disruption type based on the received service disruption notification; generate disruption identification instructions in response to the identified service disruption type; display the generated disruption identification instructions on a user interface; receive an action command in a user entry field of the user interface, the action command including a service name of the service; and dynamically generate a response to the received action command. Numerous other aspects are provided.

20 Claims, 12 Drawing Sheets

(56) References Cited

U.S. PATENT DOCUMENTS

| | | | |
|---|---|---|---|
| 2010/0229022 A1* | 9/2010 | Anand | G06F 11/0793 |
| | | | 715/708 |
| 2011/0161274 A1* | 6/2011 | Gao | G06Q 10/10 |
| | | | 706/50 |
| 2013/0007655 A1* | 1/2013 | Bridgen | G06F 3/048 |
| | | | 715/790 |
| 2014/0223428 A1* | 8/2014 | Hackett | G06F 11/3055 |
| | | | 718/1 |
| 2014/0310222 A1* | 10/2014 | Davlos | G06F 11/2294 |
| | | | 706/46 |
| 2016/0342451 A1* | 11/2016 | Ly | G06F 11/0739 |
| 2017/0286199 A1* | 10/2017 | Soini | G06F 9/44 |
| 2019/0266253 A1* | 8/2019 | Maiti | G06F 16/243 |
| 2023/0047295 A1* | 2/2023 | Martinez | G06F 11/3409 |
| 2023/0110616 A1* | 4/2023 | Mracek | B60R 16/0232 |
| | | | 701/29.1 |

* cited by examiner

SYSTEM AND METHOD FOR SERVICE DISRUPTION ANALYSIS

BACKGROUND

Organizations may use software products provided by a software provider in the operation of the organization. A non-exhaustive example of such a software product may be an enterprise resource planning (ERP) software product that may provide for integrated processes across the organization. The software provider may monitor and maintain the services provided by the software deployed at the organization via a services monitoring system and may be responsive when the service experiences disruptions. During a disruption, a software provider engineer may need to gather a lot of necessary information and perform particular actions to understand and address the disruption quickly and effectively.

Systems and methods are desired to automatically analyze and resolve service disruptions.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
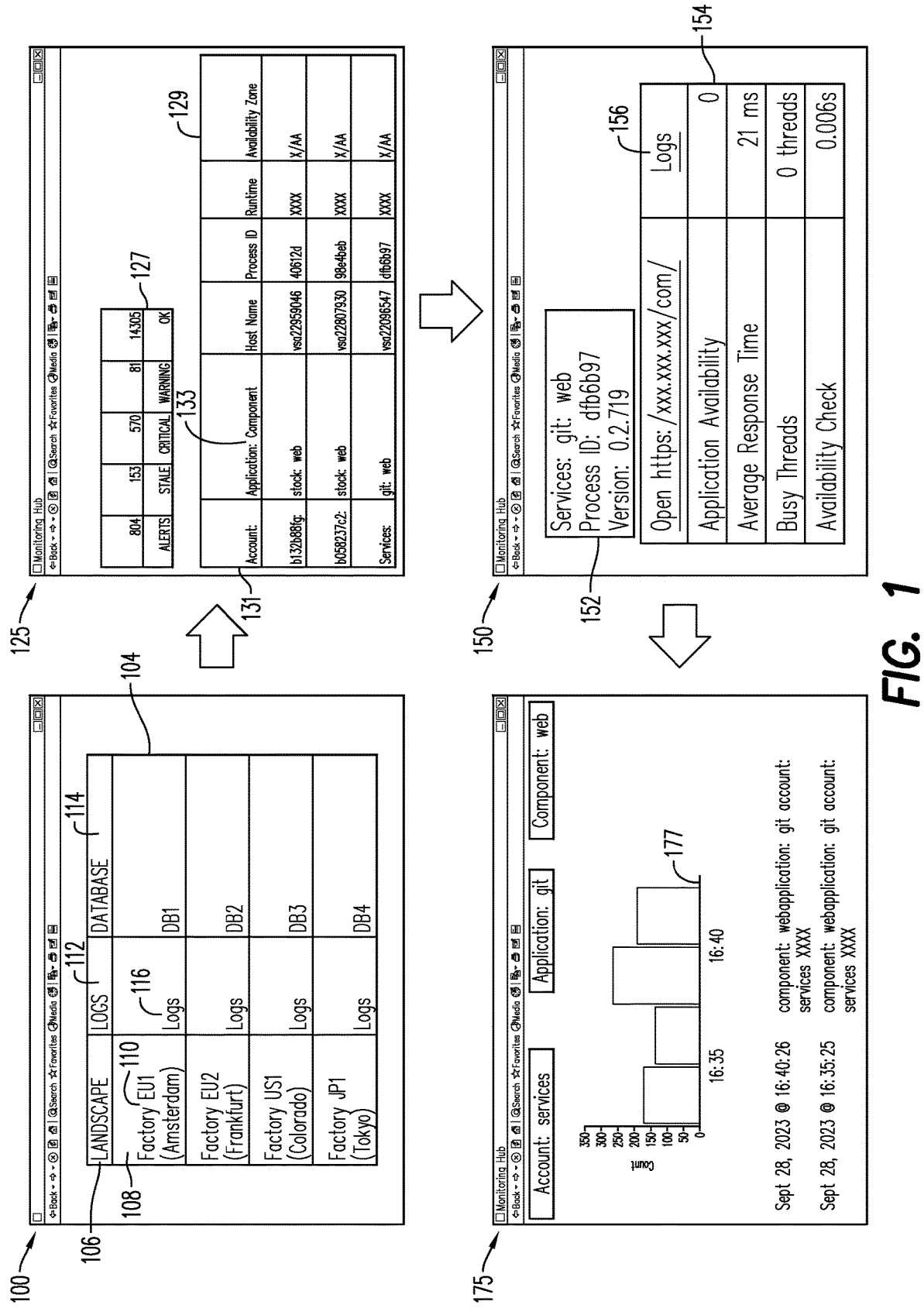
FIG. 1 is a block diagram of different user interfaces providing information during a disruption.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, an engineer may monitor the services provided by a software product. A disruption in the service may occur at any time, e.g., the middle of the night. In order to resolve the disruption, the engineer may need to gather necessary information and perform particular actions as quickly and effectively as possible. However, it may be difficult for the engineer to access the relevant information quickly during a disruption as the information may be accessible via different programs that each may take too long to load and access. As a non-exhaustive example, FIG. 1 is a block diagram of different user interfaces providing information during a disruption. A user (engineer) first receives a notification that a disruption has occurred. The notification may include at least a landscape and an application component as the source of the disruption. Then, conventionally, the user may open a first user interface 100 including a chart 104. The chart 104 may include the possible landscapes 106 where the disruption occurred. Herein, "landscape" may refer to a physical location of the disruption. The landscape 106 may be represented by a location type 108 and a location code 110. As shown in the first user interface 100, a first non-exhaustive example of a landscape 106 may be for a location type 108 of "factory" with a location code 110 of "EU1," which may be physically located in Amsterdam. A second non-exhaustive example of a landscape 106 may be for a location type 108 of "factory" with a location code 110 of "US1", which may be physically located in Colorado. The chart 104 may include, for each landscape 106, a log parameter 112 and a database parameter 114. The log parameter 112 may include a log link 116 to a log for the landscape 106. The database may be associated with the landscape. Conventionally, the engineer selects one of the log links 116, resulting in the display of a second user interface 125. The second user interface 125 may summarize the service at the landscape for which the link was selected. The second user interface 125 may include a status 127 for the overall resources in the landscape. Here the status 127 for this landscape has 804 alerts, 153 stale (old) notifications, 570 critical notifications, 81 warnings and 14305 OK resources. The second user interface 125 may also include a chart 129 of the different accounts 131 and application components 133 in this landscape 106. Conventionally, the user may select the application component 133 from the chart 129 that was included in the notification received by the user alerting the user to the disruption. In this non-exhaustive example, the application component 133 is "git: web". Selection of the application component 133 may result in the display of a third user interface 150. The third user interface 150 may provide more specific details for the application component, including a particular process executed by the component. It is noted that while one process is shown here, the component may execute a plurality of processes. The process may be identified by a process identifier 152. The third user interface 150 may include a chart 154 with some statistics for each process. The statistics include, but are not limited to application availability, average response time, busy threads, and the time it takes to execute an availability check. The third user interface 150 may also include a link 156 to the log for this specific process. Selection of the link 156 may result in the display of a fourth user interface 175. The fourth user interface 175 may provide the log for this process. The fourth user interface 175 may include a graphic 177 of metrics associated with the process, and a log summary 179.

The user may access all of these user interfaces (100, 125, 150, 175) to view the log information provided on the fourth user interface 175. In some instances, more user interfaces may be accessed to view the log information. Accessing all of these user interfaces to retrieve the log information may take an undesirable amount of time.

Additionally, once the user accesses the relevant information and determines a relevant course of action (e.g., re-starting systems, executing thread and heap dumps, executing recovery services), the user may manually execute the course of action, which may also be time-consuming and may be error-prone, leading to extended downtime of the service.

The conventional process of gathering necessary information and performing associated actions, such as thread and heap dumps, restarting systems and searching for specific links like logs or pages, may consume valuable time that may be critical during these disruptions.

Pursuant to embodiments, an outage tool is provided to provide engineers (users) with faster access to the relevant information related to the disruption as well as steps to resolve the disruption. Embodiments may enable users to take prompt and accurate actions, minimizing downtime and reducing an impact on consumers of the software product service ("service"). Non-exhaustive examples of the service include a metering service, a git service (e.g., responsible for all of the enterprise repositories with codes, data, etc.), a dependency mapping service (e.g., monitors and maps dependencies among application component in real time), a code/project creation service, etc. The outage tool may receive notification of the service disruption and identify the type of disruption via comparison to stored common error scenarios. Based on the disruption type, the outage tool may retrieve at least one of a disruption identification guide and system architecture diagram that is the most accurate for the disruption type and may display them to the user. The disruption identification guide and/or system architecture guide may include concise information about what needs to be checked. The disruption identification guide may also provide direct links to monitors and logs of the disrupted service. The outage tool may also receive pre-defined configured commands used to perform actions (e.g., searching for specific logs or pages, generating dynamic links/logs, triggering automations like restarting systems, initiating thread and heap dumps), via a centralized location, without the user having to access multiple applications. By eliminating the need for users to manually search for information and perform repetitive tasks, the outage tool saves time, allowing for faster disruption response and resolution, resulting in reduced downtime. With respect to the time-savings provided by embodiments, as non-exhaustive examples, finding the correct link for an account may conventionally take three minutes, while embodiments retrieve the correct link in one minute; opening a monitoring tool and retrieving a process identifier for the service conventionally takes five-six minutes, while embodiments take one minute to enter the "status" command for the service in question at a particular landscape and obtain the needed information; opening logs for the specific service conventionally takes five-six minutes, while embodiments take one minute to enter the "logs" command, for the service at the particular landscape and go directly to the LOG page for the specific service; triggering a heap/thread dump conventionally takes five-ten minutes, while embodiments take one-two minutes to trigger the command and complete the action; and triggering restart of the service/virtual machine conventionally takes three-four or six-eight minutes, depending on where the restart is triggered from (e.g., from an account cockpit and Neo software development kit (SDK), respectively), while embodiments take one-two minutes to trigger a "status" command in order to obtain the specific process identifier and trigger the rolling restart via a "restart" command for that process identifier. It is noted that the rolling restart process may be executed in the background and there is no additional interaction needed from the user for applications triggered from the account page and those triggered through the Neo SDK. As another non-exhaustive example with respect to the time-savings provided by embodiments, checking all of the dependencies for the disrupted service conventionally takes at least five-ten minutes, depending on how many dependencies the service has, while embodiments take one-two minutes to check the status of the dependencies via a single command.

The outage tool also provides comprehensive information and predefined steps, allowing for the quick identification of the disruption cause and resolution, reducing the time required for disruption identificationing. By providing relevant information, users may make informed decisions and perform the correct steps, minimizing the risk of errors or unnecessary actions.

Figure 2:
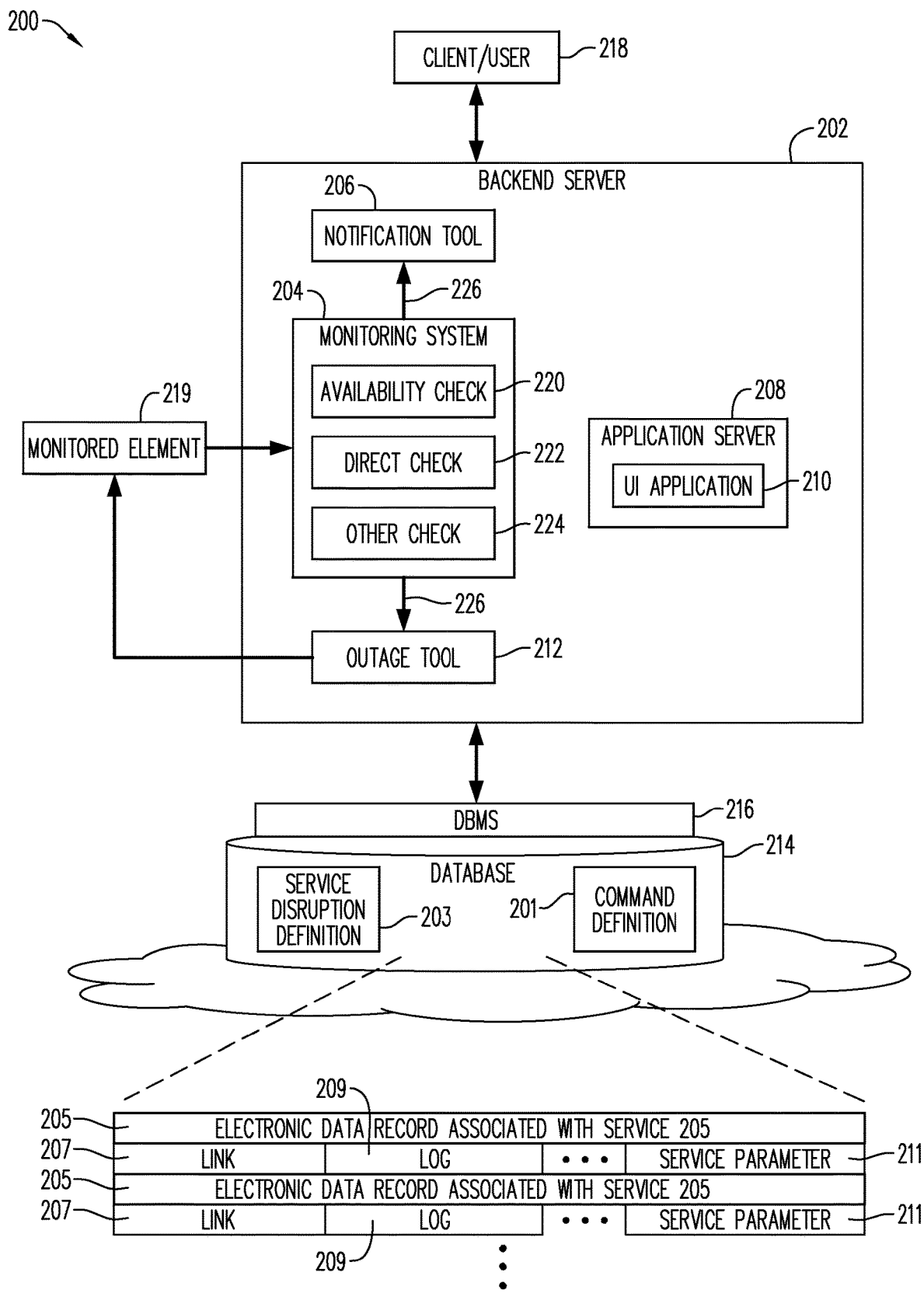
FIG. 2 is a block diagram of an architecture according to some embodiments.

FIG. 2 is a block diagram of an architecture 200 according to some embodiments. The illustrated elements of architecture 200 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of architecture 200 are implemented by a single computing device, and/or two or more elements of architecture 200 are co-located. One or more elements of architecture 200 may be implemented using cloud-based resources, and/or other systems which apportion computing resources elastically according to demand, need, price, and/or any other metric.

Architecture 200 may include a backend server 202 including a monitoring system 204, a notification tool 206, an application server 208 including an application 210, an outage tool 212, a database 214, a database management system (DBMS) 216, and a client/user 218. As used herein, the terms "client", "user" and "end-user" may be used interchangeably.

Applications 210 may comprise server-side executable program code (e.g., compiled code, scripts, etc.) executing within application server 208 to receive queries/requests from client/users 218 and provide results to client/users 218 based on data of database 214 and the output of the outage tool 212. Client/users 218 may access the outage tool 212 to retrieve information, perform an analysis, and execute resolutions, as described further below. Generally, applications 210 may comprise any software applications that are or become known, including but to limited to data analytics applications.

The backend server 202 may provide any suitable interfaces through which users 218 may communicate with the outage tool 212 or applications 210 executing thereon. The backend server 202 may include a Hyper Text Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

The client/user 218 may be at least one of an individual, a user interface program, a user interface server, another system or any other suitable device executing program code of a software application for presenting user interfaces (e.g., graphical user interface (GUI)) to allow interaction with the application (e.g., a UI application) 210/backend server 202. Presentation of a user interface may comprise any degree or type of rendering, depending on the type of user interface code generated by the application 210. For example, a client/user 218 may execute a Web Browser request and receive a Web page (e.g., in HTML format) via HTTP, HTTPS and/or WebSocket, from an application 210 of the backend server 202 to provide the UI, and may render and present the Web page according to known protocols. The client/user 218 may also or alternatively present user interfaces by executing a standalone executable file (e.g., an .exe file) or code (e.g., a JAVA applet) within a virtual machine.

The monitoring system 204 may execute a plurality of checks on a monitored element 219. The monitored element 219 may be a software product executing as a service, or any other suitable monitored element. The plurality of checks may include, but are not limited to, an availability check 220, a direct check 222 and other checks 224. The availability check 220 may monitor the monitored element 219 for its availability. The monitored element 219 may be regarded as available if a message server at the monitored element 219 responds to an availability agent's (of the monitoring system 204) query and at least one application server is registered as active with the message server. The direct check 222 may monitor other (not availability) operational aspects of the monitored element 219. For example, the direct check 222 may request a particular resource or status from the monitored element 219. The other checks 224 may include, but are not limited to, receiving metrics from the monitored element 219 and comparing them to rules (e.g., thresholds) included in a service disruption definition 203 stored in the database 214 to trigger a notification. The monitoring system 204 may collect the data from the plurality of checks and determine whether a service disruption exists based on an output of at least one of the plurality of checks as compared to one or more rules stored in the database 214. In a case a service disruption is determined, the monitoring system 204 may transmit a service disruption notification 226 to both the notification tool 206 and the outage tool 212.

The notification tool 206 may receive the service disruption notification 226 and contact the user designated to receive service disruption notifications. The notification tool 206 may interface to the monitoring system 204 and then forward the service disruption notification to the user 218. The notification may be received via any suitable communication medium, including, but not limited to, telephone call, e-mail, text, video etc.

The outage tool 212 provides pre-defined commands to retrieve information and is also a pro-active recommended action creator that generates critical step-by-step recommended actions dynamically, based on a specific type of disruption. The outage tool 212 may receive the service disruption notification from the monitoring system 204. The service disruption notification 226 may include a service identifier indicating which service is a disrupted service (e.g., which service failed), a landscape identifier indicating the landscape of the service disruption, and a disruption reason. Based on the information included in the service disruption notification 226, the outage tool 212 may generate a pre-defined recommended action in the form of a disruption identification guide. The disruption identification guide may include steps for initially identifying the disruption, and may display concise information about elements that may need to be checked by the user. The disruption identification guide may also include links to monitors and/or logs of the disrupted service, providing for fast access and ensuring that a correct estimation of impact may be made based on the data. The disruption identification guide may be generated while the notification tool 206 is contacting the designated user, such that when the designated user accesses the outage tool 212 via a graphical user interface, the disruption identification guide is immediately presented to the designated user. Pursuant to embodiments, the outage tool 212 may be integrated in a cloud platform (e.g., Google Cloud Platform (GCP)®). The outage tool 212 may include a plurality of predefined commands that may be used by the user to retrieve information about the disruption. The use of the commands may be another disruption identification step. The outage tool 212 may receive commands from the user and execute the commands via a POST request method, or other suitable method. Pursuant to some embodiments, the commands may be received in a cloud-based messaging service (e.g., SLACK®) that may be used as a user interface. In other embodiments, the commands may be received in an application-based graphical user interface. The central location provided by the outage tool to access this information may save time and allow a user to focus on the incident impact and resolution as compared to the conventional process of opening various monitoring tools and setting up correct search filters. The outage tool 212 may include its own Active list of authorized users, and the outage tool 212 may check that the user is on the Active list and is authorized to access the outage tool 212 prior to providing information to the user to prevent unauthorized access to the information.

One or more applications 210 executing on backend server 202 may communicate with DBMS 216 using database management interfaces such as, but not limited to, Open Database Connectivity (ODBC) and Java Database Connectivity (JDBC) interfaces. These types of applications 210 may use Structured Query Language (SQL) to manage and query data stored in database 214.

DBMS 216 serves requests to store, retrieve and/or modify data of database 214, and also performs administrative and management functions. Such functions may include snapshot and backup management, indexing, optimization, garbage collection, and/or any other database functions that are or become known. DBMS 216 may also provide application logic, such as database procedures and/or calculations, according to some embodiments. This application logic may comprise scripts, functional libraries and/or compiled program code. DBMS 216 may comprise any query-responsive database system that is or becomes known, including but not limited to a structured-query language (i.e., SQL) relational database management system.

Backend server 202 may provide application services (e.g., via functional libraries) which applications 210 may use to manage and query the data of database 214. The application services can be used to expose the database data model, with its tables, hierarchies, views and database procedures, to clients. In addition to exposing the data model, backend server 202 may host system services such as a search service.

Database 214 may store data used by at least one of: applications 210 and the outage tool 212. For example, database 214 may include a service data store storing a set of electronic records 205 for monitored services. Each record 205 may include, for example, a link 207 to the service account page URL, a service log 209, and other suitable parameters 211 for the service, which may be accessed by the outage tool 212 during execution thereof.

Database 214 may comprise any query-responsive data source or sources that are or become known, including but not limited to a structured-query language (SQL) relational database management system. Database 214 may comprise a relational database, a multi-dimensional database, an extensible Markup Language (XML) document, or any other data storage system storing structured and/or unstructured data. The data of database 214 may be distributed among several relational databases, dimensional databases, and/or other data sources. Embodiments are not limited to any number or types of data sources.

Figure 3:
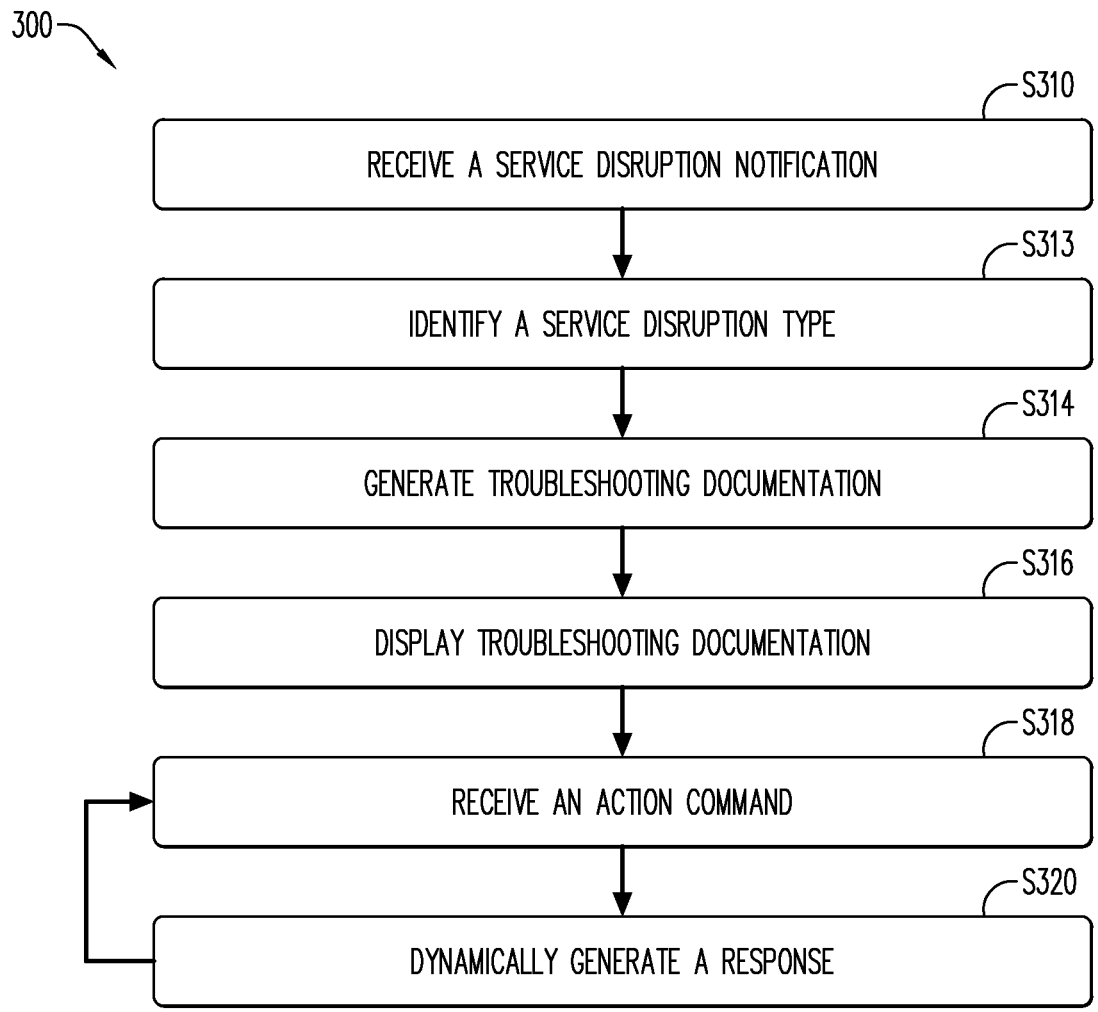
FIG. 3 is a flow diagram of a process according to some embodiments.

FIG. 3 illustrates a process 300 for responding to a service disruption in accordance with an example embodiment.

For example, the process 300 may be performed by a database node, a cloud platform, a server, a computing system (user device), a combination of devices/nodes, or the like, according to some embodiments. In one or more embodiments, the backend server 202 may be conditioned to perform the process 300 such that a processing unit 1235 (FIG. 12) of the system architecture 200 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to the process 300, a plurality of service disruptions may be defined. The service disruption definition 203 may include, but is not limited to, a disruption type identifier, a service identifier for the service experiencing the disruption, thresholds and/or rules that initiate a disruption, and disruption identification steps. The values for the service disruption definition may be provided by an administrator, engineer, or any other suitable source. The definitions may provide recommended steps mapped to the different possible disruptions.

Initially, at S310, a service disruption notification is received. The service disruption notification may be received from the monitoring system 204 and may be received by the notification tool 206 and by the outage tool 212.

Figure 4:
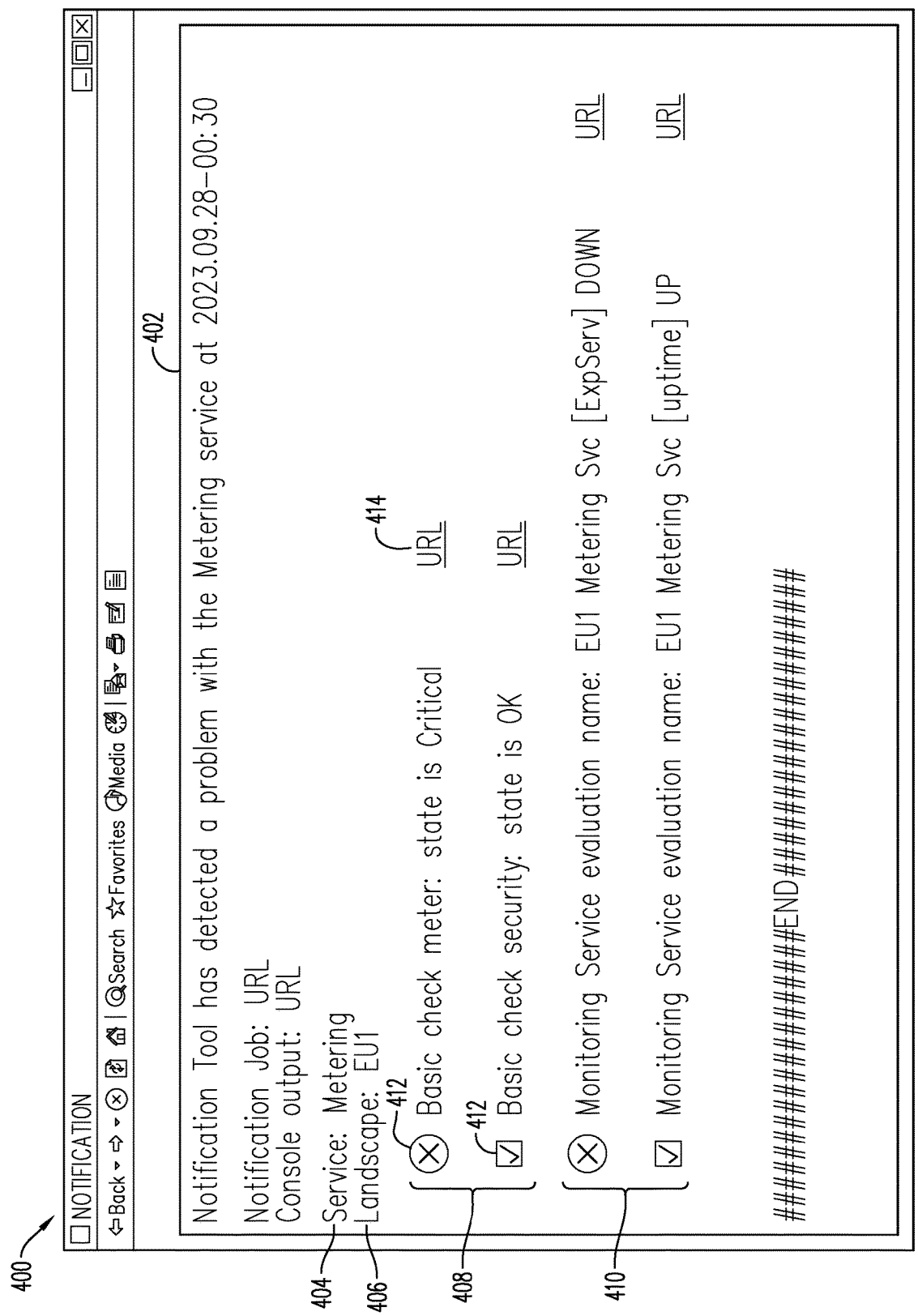
FIG. 4 is a user interface of a notification according to some embodiments.

As described above, the notification tool 206 may forward the service disruption notification 402 (FIG. 4) to the user 218. The notification may be received via any suitable communication medium, including, but not limited to, telephone call, e-mail, text, video, etc. As a non-exhaustive example, FIG. 4 provides a notification user interface 400. The service disruption notification 402 may include a service parameter 404, a landscape parameter 406, one or more metrics 408, and one or more monitoring service evaluations 410. The service disruption notification 402 may include a status indicator 412 for each of the metrics 408 and the monitoring service evaluations 410. The status indicator 412 may be a check icon or an "x" icon indicating a "pass" or a "fail" status. Other suitable icons and/or status indicators may be used. The service disruption notification 402 may also include a URL link 414 for each of the metrics 408 and the monitoring service evaluations 410. Here, the value for the service parameter 404 is "metering" and the value for the landscape parameter 406 is "EU1". While there are two metrics 408—a basic check meter, a basic check security—shown herein, other suitable numbers of metrics may be used. The state for the basic check security metric is "OK" and the status indicator is a check icon meaning "pass", while the state of the basic check meter metric is "Critical" and the status indicator is an "X" icon meaning "fail." The status of the monitoring service evaluation (uptimer) is "Up" meaning "pass", while the status of the monitoring service evaluation (Expserv) is "Down" meaning "fail"). Selection of any of the URL links 414 will open the application associated with that metric/monitoring service.

Figure 5:
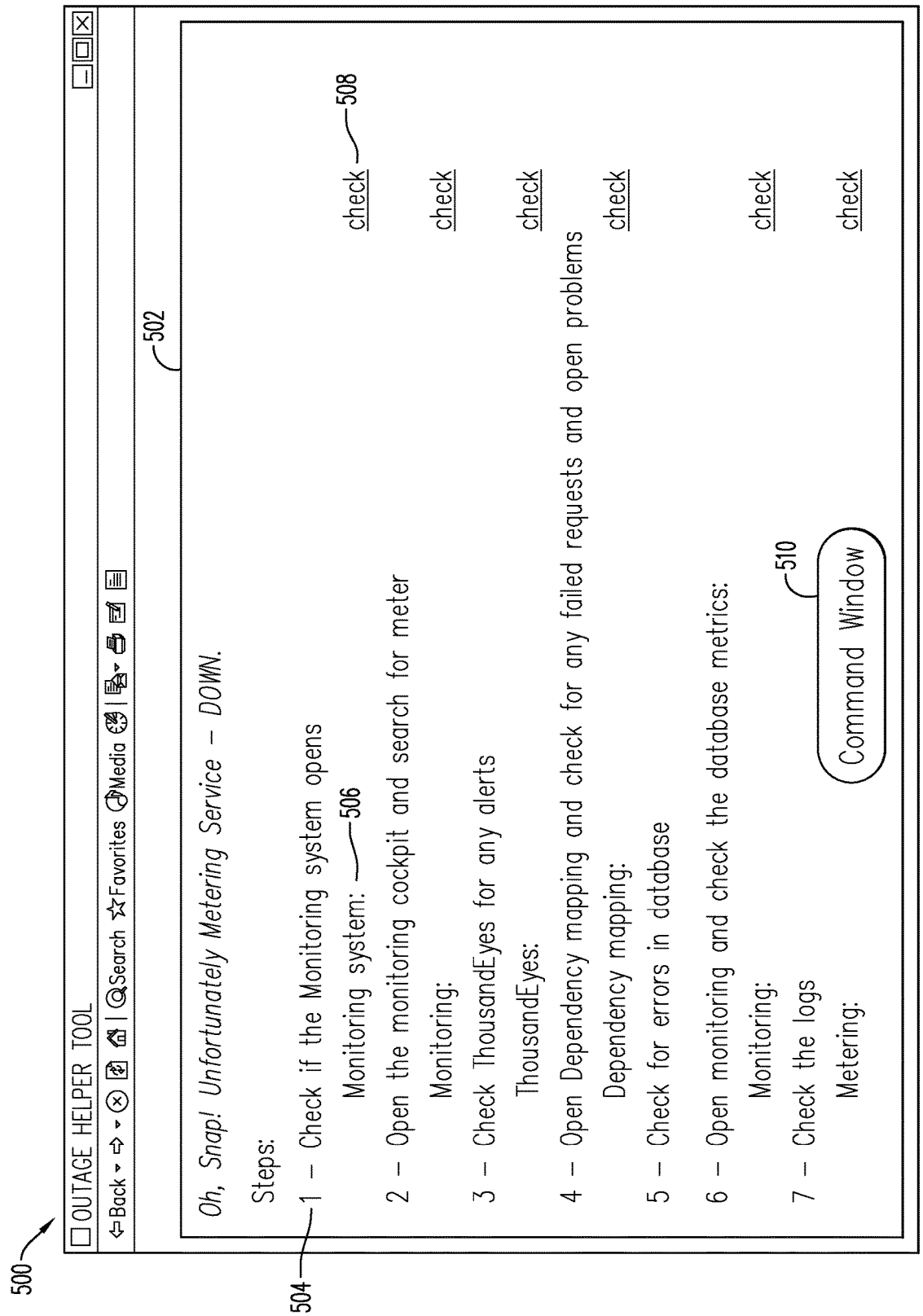
FIG. 5 is user interface including a non-exhaustive disruption identification guide according to some embodiments.

In response to receipt of the service disruption notification by the outage tool 212, a service disruption type is identified in S312. The service disruption type may be based on an analysis of the information included in the service disruption notification (e.g., a service parameter 404 indicating which service is a disrupted service (e.g., which service failed), a landscape parameter 406 indicating the landscape of the service disruption, and the failed metric (e.g., a disruption reason)) and the service disruption definitions 203. Based on the identified service disruption type, the outage tool 212 may generate a pre-defined recommended action in the form of disruption identification instructions 502 (FIG. 5) in S314. As a non-exhaustive example, FIG. 5 provides a disruption identification user interface 500. Pursuant to some embodiments, the disruption identification user interface 500 may be displayed when the client/user 218 opens the outage tool 212. The disruption identification instructions 502 may include one or more steps 504 including elements to check to address the disruption. Here, step 1 is: "Check if the Monitoring system opens"; step 2 is "Open the monitoring cockpit and search for meter"; step 3 is "Check ThousandEyes for any alerts"; step 4 is "Open Dependency mapping and check for any failed requests and open problems"; step 5 is "Check for errors in database"; step 6 is "Open monitoring and check the database metrics"; and step 7 is "Check the logs". Each step 504 may include a task 506 for checking. Here, the task for step 1 is: "Monitoring system"; the task for step 2 is: "Monitoring"; the task for step 3 is: "ThousandEyes"; the task for step 4 is: "Dependency mapping"; the task for step 6 is "Monitoring"; and the task for step 7 is "Metering". It is noted that in some instances a step may have zero tasks (e.g., a manual instruction), and in other instances a step may include more than one task. Each task 506 may be a microservice associated with the service and may be associated with a check link 508. A non-exhaustive example of a check link may be a jp1® link. Selection of the check link 508 may bring the user to a screen to execute a task/microservice. The task may include, but is not limited to, checking if a program opens, creating a project, checking a log for particular entries, checking for running instances, checking for critical metrics, checking for alarms, checking a server's operating status, restarting servers, adding virtual machines and recovery tasks.

The disruption identification user interface 500 may also include a "Command Window" icon 510. Selection of the Command Window icon 510 may result in the display of the command window user interface 600 of FIG. 6. The command window user interface 600 may include a history display 602 and a command user entry field 604. The command user entry field 604 may include an "Enter" icon 606. In some instances, the task 506 in the disruption identification user interface 500 may list a command for the user to enter in the command user entry field. It is noted that from a security perspective, it may be desirable to have the user physically enter a command in the command window user interface as opposed to selecting a link for the command in the disruption identification user interface to prevent mis-clicks and inadvertent selection of commands.

Figure 6:
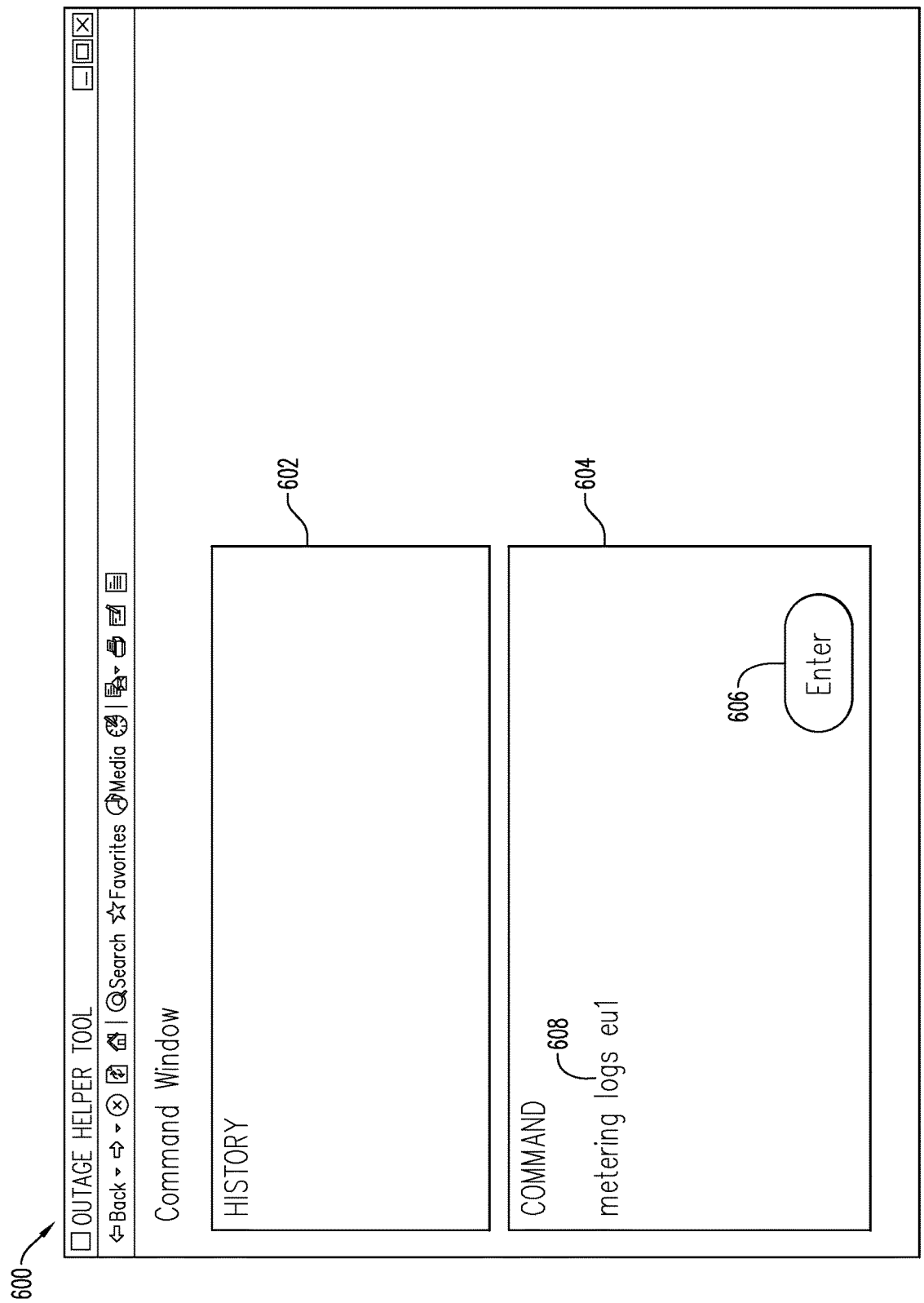
FIG. 6 is a user interface command window, including a non-exhaustive example of a first command, according to some embodiments.
Figure 7:
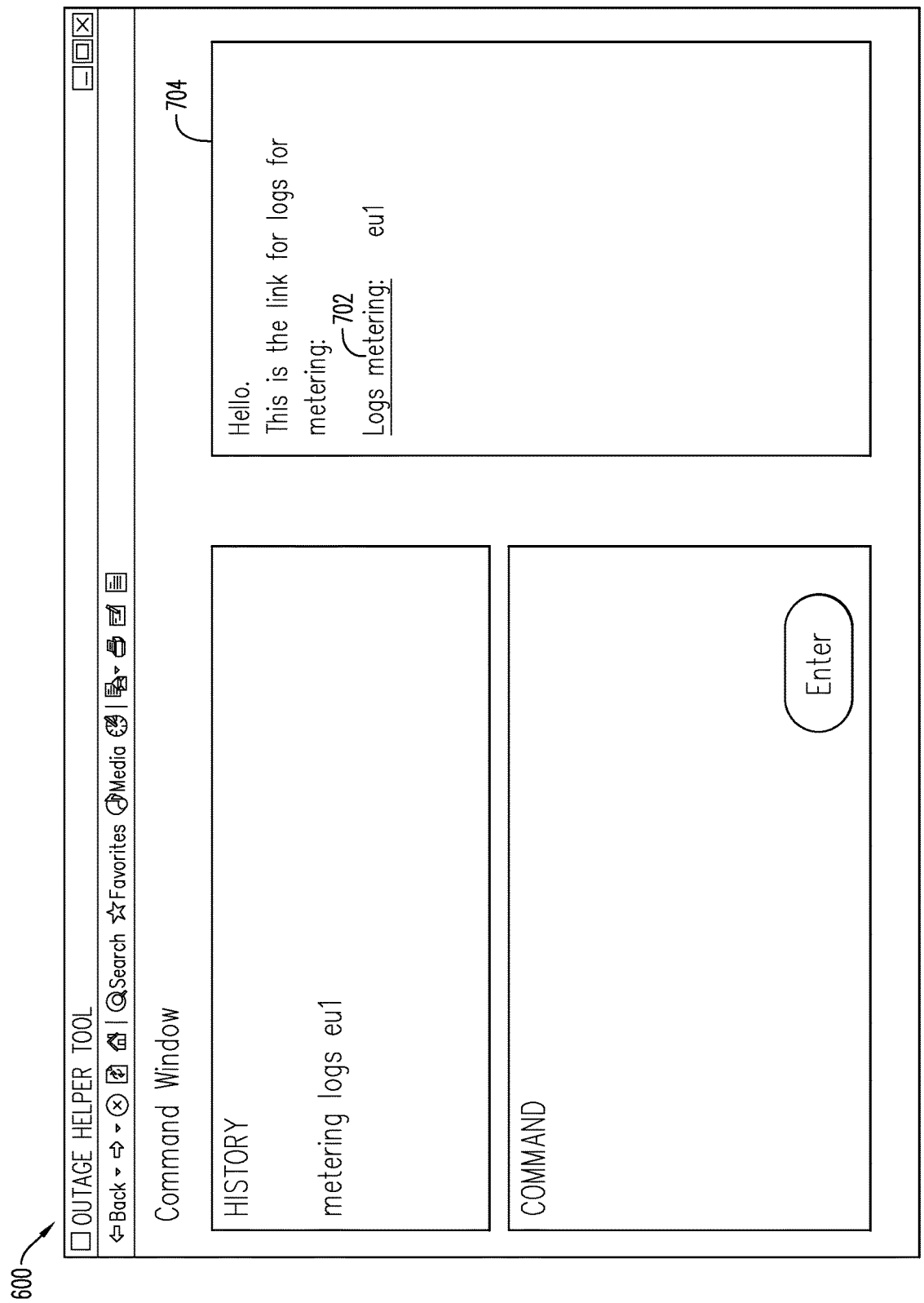
FIG. 7 is a user interface command window, including a non-exhaustive example of a first command response, according to some embodiments.

Turning back to the process 300, an action command is received in S318. The action command may include a service (e.g., service name), a command and a landscape. The action command may be received in the command user entry field 604. Pursuant to some embodiments, prior to the action command including a service, a command and a landscape, a user may enter a "help" command in the command user entry field 604. Although not shown, the "help" command may display all of the commands stored in a library of the outage tool 212 that may be executed by the outage tool 212. As described above, the command may be pre-defined and the command definition 201 may be stored in the library and/or the database 214. In response to entry of the action command, the outage tool 212 may access the command definition 201 and create the action specified by the command. The command definition 201 may define the action in a format that may be used by the recipient of the command. For example, if the command is to retrieve information from service A, the action may be written in a format that may be executable by service A. As shown in FIG. 6, a non-exhaustive example of the action command 608 is "metering logs eu1", where "metering" is the service, "logs" is the command and "eu1" is the landscape. Selection of the "Enter" icon 606 may result in the dynamic generation of a response 702 (FIG. 7) in S320. Depending on the command, in some instances, the dynamically generated response 702 may be displayed in a response window 704 shown in FIG. 7. Here, the dynamically generated response 702 includes a link to the metering log. Conventionally, the user would have to access the account page for the service and then find the log for the service. Embodiments avoid the user having to first go the account page and then find the log by instead providing a link to the log with a single command. While not shown, selection of the link directly opens the metering log. Selection of the "Enter" icon 606 may also result in the user entered action command moving from the command user entry field 604 to the history display 602.

The process 300 may then return to S318, and another action command may be received. Additional actions may be received at the user discretion. For example, a "dependency" command may identify all of the dependencies for the specific service (e.g., services that receive an output from the disrupted service for the operation of that dependent service) and landscape and provide a status for each of the dependent services. The status may be in a form of a status report. In a case a service fails, there may be other services that depend on the failed service (e.g., database storage, firewall, another service, etc.). The "dependency" command may provide a quick overview of the status of the dependencies without the user having to manually search for each one, or look through other notifications for disruptions, etc. The "dependency" command may access a dependency checker database or other storage that maps the different dependencies, storages and databases.

Figure 8:
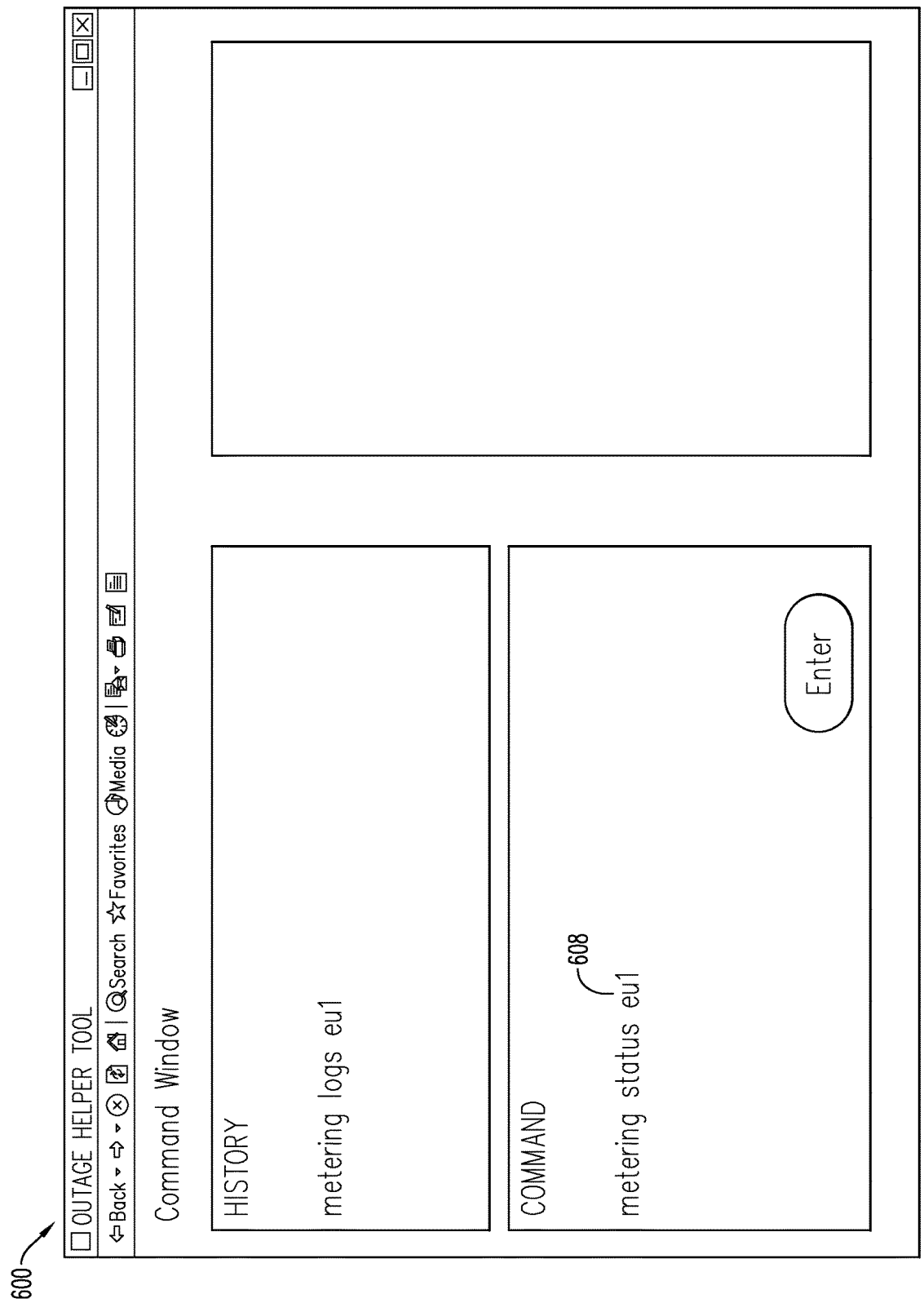
FIG. 8 is a user interface command window, including a non-exhaustive example of a second command, according to some embodiments.
Figure 9:
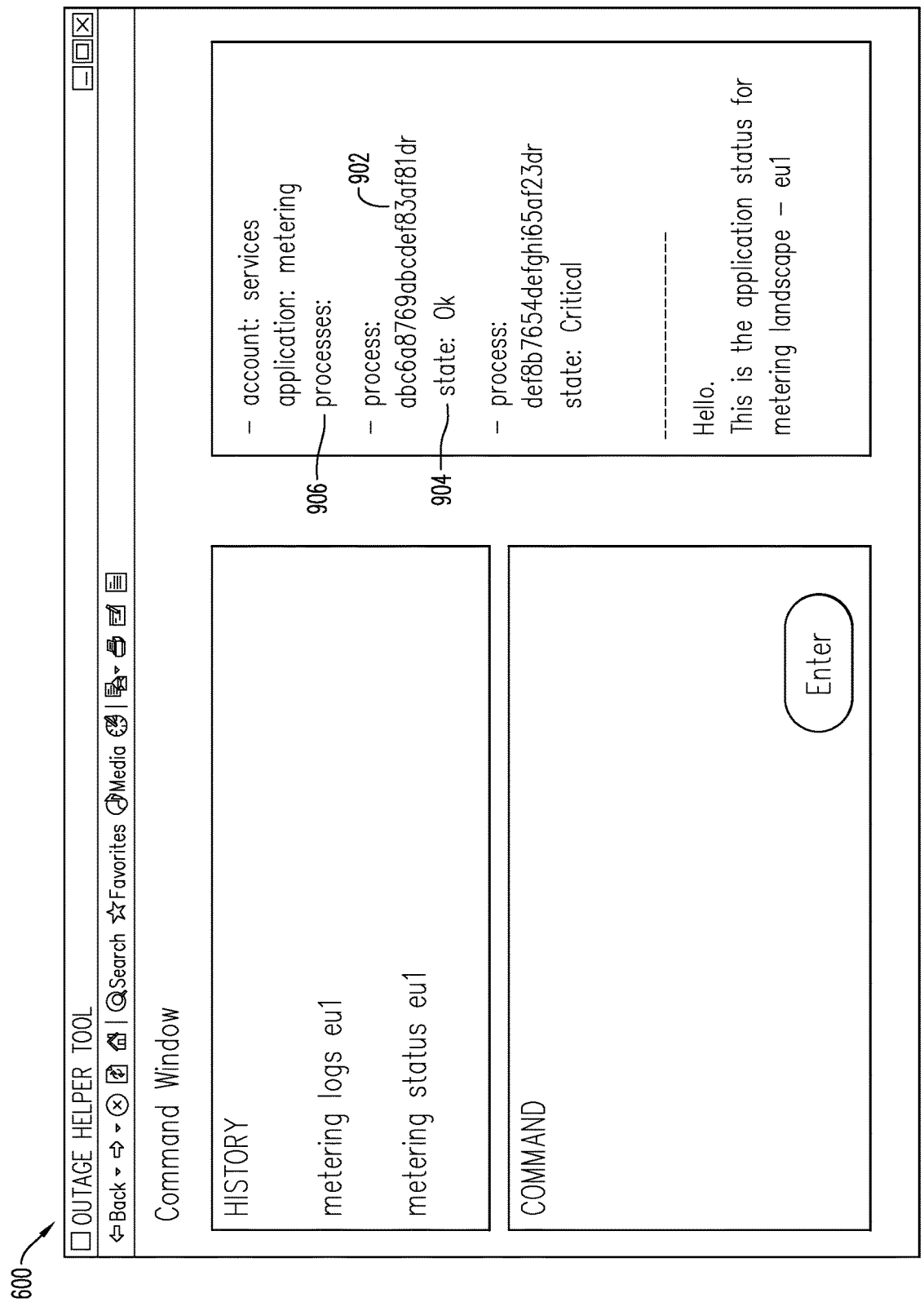
FIG. 9 is a user interface command window, including a non-exhaustive example of a second command response, according to some embodiments.

As another non-exhaustive example shown in FIG. 8, the action command 608 is "metering status eu1", where "metering" is the service, "status" is the command and "eu1" is the landscape. The "status" command may provide the specific real time status for the service and landscape, as well as the process identifiers (virtual machines) that are running the service and their current state. The "status" command may retrieve an identifier and state for one or more monitored processes executed by the service. Selection of the "Enter" icon 606 may result in the dynamically generated response 702 displayed in the response window 704 of FIG. 9. Here, the dynamically generated response 702 includes two monitored processes 906 executed by the service "metering". The identifier 902 for the first process 906 is "abc6a8769abcdef83af81dr" and the state 904 is "OK", indicating this is not the reason for the disruption. The identifier 902 may be a unique number that represents the process executed by a virtual machine. The identifier 902 for the second process 906 is "def8b7654defghi65af23dr" and the state 904 is "Critical," indicating this unique process ID has a problem and may be the cause for the disruption. Conventionally, to obtain the status, the user has to find the service from a list of services (FIG. 1), find the link for the account page for the service, access the service, and find the specific process having the disruption, which includes more steps and uses more bandwidth than the use of the "status" command provided by one or more embodiments.

In some instances, the action command received in S318 may be a command to dynamically initialize an automation for a particular process, and the initiation of the automation may be the generated response to selection of the "Enter" icon 606 in S320. The automation commands may be used as part of an automated recovery process and may use the identifier for the process. The automation command may be a command to initiate a thread dump, a heap dump, restart a system ("system restart"), or other suitable automation command. As used herein, a "heap dump" may be a snapshot of all of the objects in a virtual machine heap at a certain point in time and may be used to detect memory leaks. As used herein, a "thread dump" may be a collection of stack traces, one for each thread that is running in the instance and may be used to check whether the system is stuck in a deadlock condition. It is noted that while herein the automation initialization action command is received after the "log" and "status" action commands, the action commands may be received in any suitable order.

Figure 10:
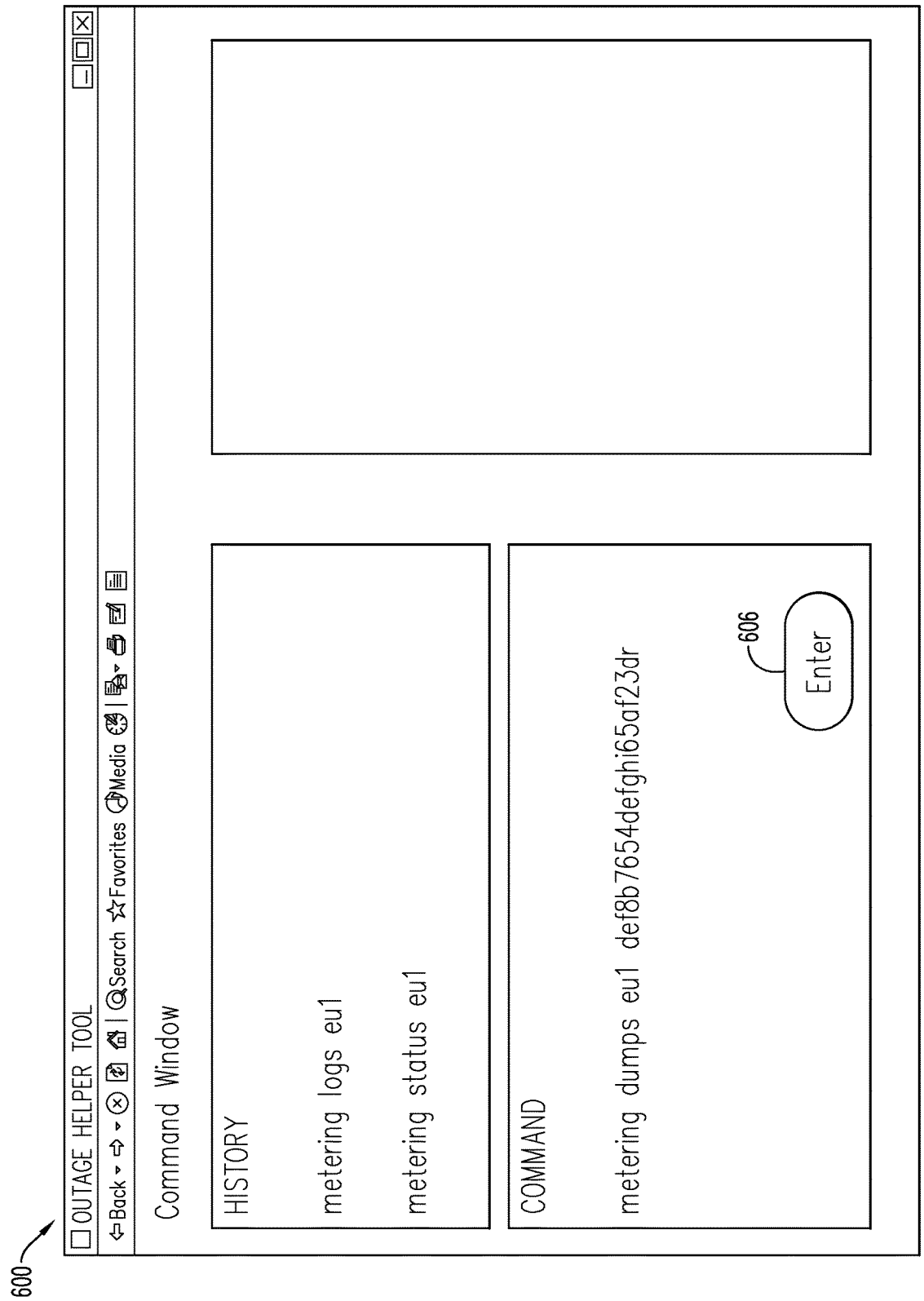
FIG. 10 is a user interface command window, including a non-exhaustive example of a third command, according to some embodiments.
Figure 11:
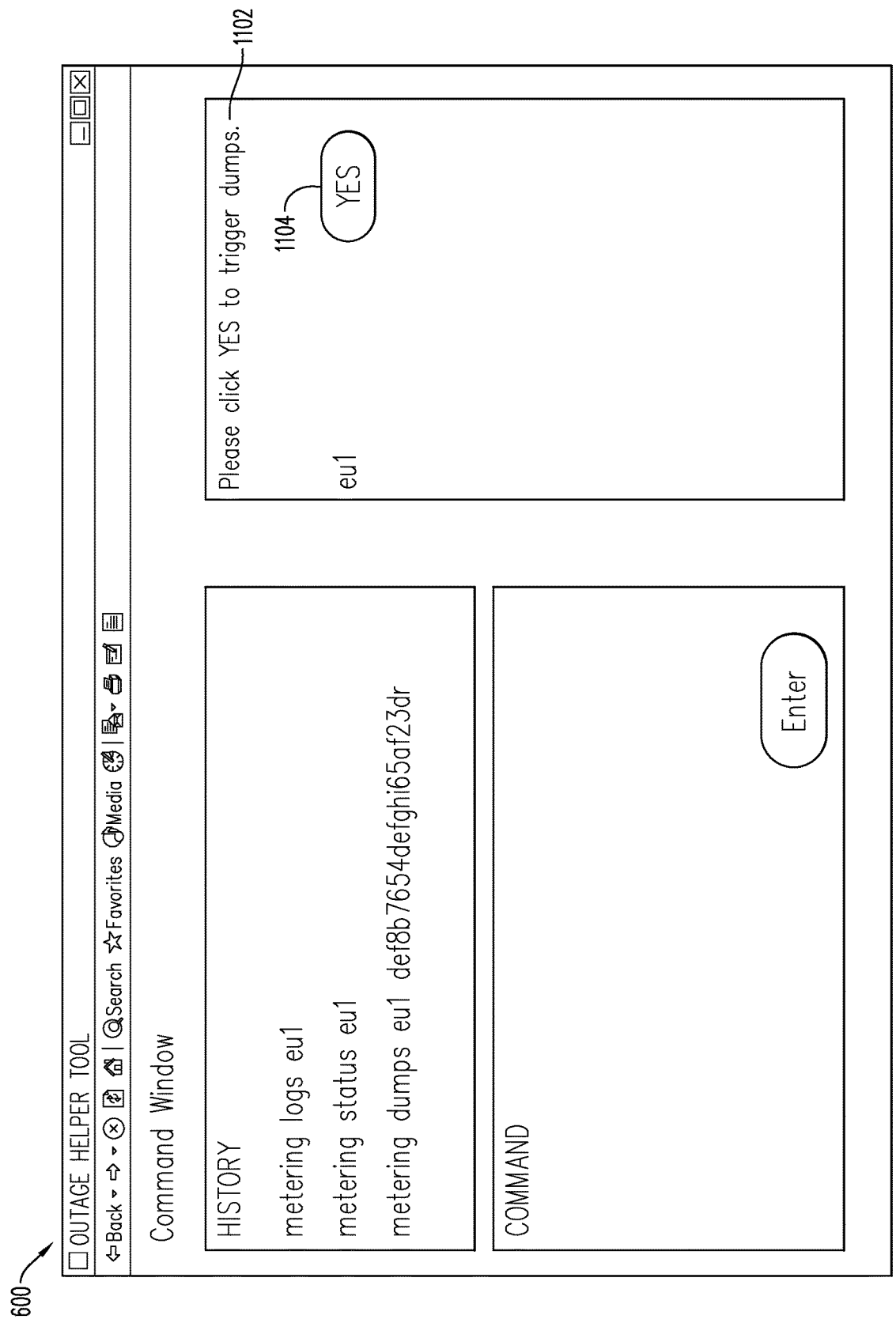
FIG. 11 is a user interface command window, including a non-exhaustive example of a third command response, according to some embodiments.

FIG. 10 is a non-exhaustive example including receipt of an automation command in the command user entry field 604. The example of FIG. 10 may be based on the state of the second process ("Critical") in FIG. 9. Here, the automation action command is "metering dumps eu1 def8b7654defghi65af23dr," where "metering" is the service, "dumps" is the automation command, "eu1" is the landscape, and "def8b7654defghi65af23dr," is the process for which the dump is performed. Pursuant to some embodiments, the response window 704 may include a history of the previous responses (not shown), and the user may cut the process identifier 902 from the response window 704 and paste it into the command user entry field 604. Given the nature of the automation commands, it may be desirable to include an additional step of confirming the automation command prior to initiation of the command. After entry of the automation action command, selection of the "Enter" icon 606 may result in a confirmation request 1102 and "Yes" icon 1104 displayed in the response window 704 of FIG. 11. In response to selection of the "Yes" icon 1104, the automation command will automatically execute. Here, in response to selection of the "Yes" icon 1104, the dump process will begin. An "accountpage" command (not shown) may then be used to provide the exact link for the "metering" service's accountpage in the response window 704. The user may then select the link to confirm that the automation is complete and the logs are available. It is further noted that the "accountpage" command may be used initially to obtain the link to the service's account page without looking through documentation and notes and searching for the correct link.

Pursuant to one or more embodiments, the outage tool 212 may be integrated with a generative artificial intelligence (AI) large language model (LLM). The generative AI LLMs may allow users to quickly generate new content based on a variety of input. Non-exhaustive examples of generative AI LLMs include ChatGPT®, OpenAPI®, etc. In these embodiments, based on the identified disruption type, the outage tool 212 may access the LLM. A question may then be generated using the outage tool and the LLM based on the identified disruption type, and the question may be displayed in the response window 704. The outage tool 212 may next receive the user response to the generated question in the user entry field 604. Based on the response, another question may be generated or information may be provided in the response window to help the user troubleshoot and resolve the disruption. Integration of the outage tool 212 with the LLM may further provide for the automatic execution of action commands. As a non-exhaustive example, after outage tool 212 identifies a critical state or that the virtual machine itself is in a critical state, the outage tool and LLM may initiate the restart of the virtual machine. As another non-exhaustive example, when the outage tool 212 receives a notification of a problem, the LLM may begin accessing the tasks in the disruption identification guide to identify the error/disruption.

Figure 12:
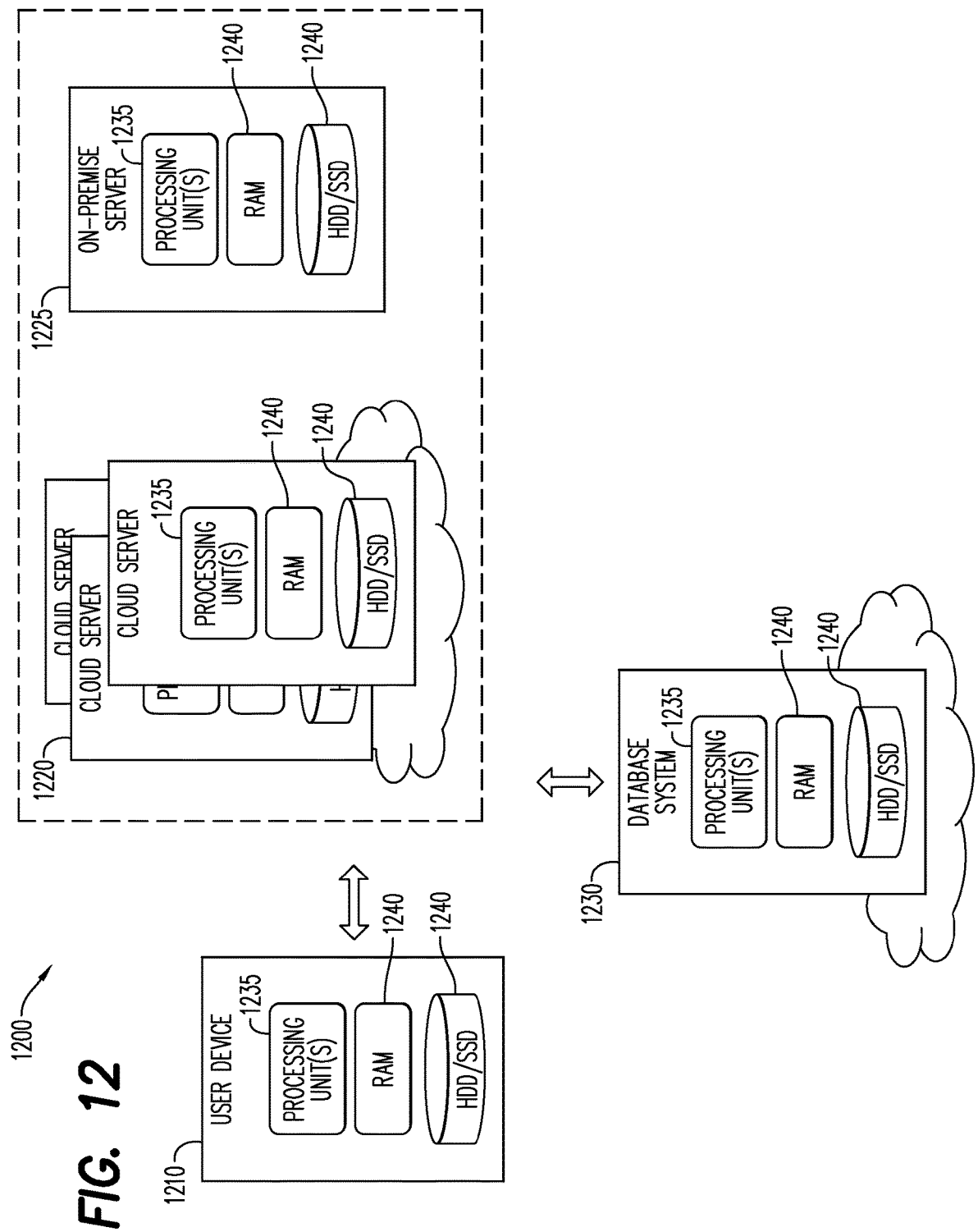
FIG. 12 is a block diagram of a cloud-based database deployment architecture according to some embodiments.

FIG. 12 illustrates a cloud-based database deployment 1200 according to some embodiments. The illustrated components may reside in one or more public clouds providing self-service and immediate provisioning, autoscaling, security, compliance and identity management features.

User device 1210 may interact with applications executing on one of the cloud application server 1220 or on-premise application server 1225, for example via a Web Browser executing on user device 1210, in order to create, read, update and delete data managed by database system 1230. Database system 1230 may store data as described herein and may execute processes as described herein to cause the execution of the outage tool 212 for use with the user device 1210. Cloud application server 1220 and database system 1230 may comprise cloud-based compute resources, such as virtual machines, allocated by a public cloud provider. As such, cloud application server 1220 and database system 1230 may be subjected to demand-based resource elasticity. Each of the user device 1210, cloud application server 1220, on-premise application server 1225 and database system 1230 may include a processing unit 1235 that may include one or more processing devices each including one or more processing cores. In some examples, the processing unit 1235 is a multicore processor or a plurality of multicore processors. Also, the processing unit 1235 may be fixed or it may be reconfigurable. The processing unit 1235 may control the components of any of the user device 1210, cloud application server 1220, on-premise application server 1225 and database system 1230. The storage devices 1240 may not be limited to a particular storage device and may include any known memory device such as RAM, ROM, hard disk, and the like, and may or may not be included within a database system, a cloud environment, a web server or the like. The storage 1240 may store software modules or other instructions/executable code which can be executed by the processing unit 1235 to perform the method shown in FIG. 3. According to various embodiments, the storage device 1240 may include a data store having a plurality of tables, records, partitions and sub-partitions. The storage device 1240 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/ machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
    a memory storing processor-executable program code; and
    a processing unit to execute the processor-executable program code to cause the system to
        receive a service disruption notification for a service;
        identify a service disruption type based on the received service disruption notification;
        generate disruption identification instructions in response to the identified service disruption type;
        display the generated disruption identification instructions on a user interface;
        receive an action command in a user entry field of the user interface, the action command including a service name of the service;
        in response to receipt of the action command in the user entry field:
            automatically access a command definition in a database, the command definition for the action command and defining an action in a service-specific executable format, and
            create the action defined by the command definition in the service-specific executable format;
        execute, by the service, the action defined by the command definition, wherein the action is one of initialization of an automation process at the service, retrieval of a state of the service, and retrieval of a link to the service;
        and
        dynamically generate a response to execution of the action.

2. The system of claim 1, wherein the disruption identification instructions include at least one of a plurality of disruption identification guides and one or more system architecture diagrams.

3. The system of claim 1, wherein the dynamically generated response is one of a status for the service and a log link for a service log associated with the service name.

4. The system of claim 1, wherein the action command automatically initiates one of a system restart and a thread dump.

5. The system of claim 4, wherein the automatic initiation includes a generation of a unique process identifier for a virtual machine experiencing the service disruption.

6. The system of claim 1, wherein the action command includes a landscape.

7. The system of claim 1, wherein the service disruption notification is received by both a user and an outage tool.

8. The system of claim 1, wherein the service disruption notification is received from a monitoring system.

9. The system of claim 1, further comprising processor-executable program code to cause the system to:
    identify one or more dependent services; and
    display the identified one or more dependent services on the user interface.

10. The system of claim 9, wherein the one or more dependent services are at least one of a second service and a database.

11. The system of claim 9, further comprising processor-executable program code to cause the system to:
    retrieve a status report for each identified one or more dependent services.

12. A computer-implemented method comprising:
    receiving a service disruption notification for a service;
    identifying a service disruption type based on the received service disruption notification;
    generating disruption identification instructions in response to the identified service disruption type;
    displaying the generated disruption identification instructions on a user interface;
    receiving an action command in a user entry field of the user interface, the action command including a service name of the service and a landscape;
    in response to receipt of the action command in the user entry field:
        automatically accessing a command definition in a database, the command definition for the action command and defining an action in a service-specific executable format, and
        creating the action defined by the command definition in the service-specific executable format;
    executing, by the service, the action defined by the command definition, wherein the action is one of initialization of an automation process at the service, retrieval of a state of the service, and retrieval of a link to the service;
    and
    dynamically generating a response to execution of the action.

13. The method of claim 12, wherein the dynamically generated response is one of a status for the service and a log link for a service log associated with the service name.

14. The method of claim 12, wherein the action command automatically initiates one of a system restart and a thread dump.

15. The method of claim 14, wherein the automatic initiation includes a generation of a unique process identifier for a virtual machine experiencing the service disruption.

16. The method of claim 12, wherein the service disruption notification is received by both a user and an outage tool.

17. The method of claim 12, further comprising:

identifying one or more dependent services; and displaying the identified one or more dependent services on the user interface and a status for each dependent service.

18. A non-transitory computer readable medium having executable instructions stored therein to perform a method, the method comprising:

receiving a service disruption notification for a service;

identifying a service disruption type based on the received service disruption notification;

generating disruption identification instructions in response to the identified service disruption type;

displaying the generated disruption identification instructions on a user interface;

receiving an action command in a user entry field of the user interface, the action command including a service name of the service and a landscape;

in response to receipt of the action command in the user entry field:

automatically accessing a command definition in a database, the command definition for the action command and defining an action in a service-specific executable format, and creating the action defined by the command definition in the service-specific executable format;

executing, by the service, the action defined by the command definition, wherein the action is one of initialization of an automation process at the service, retrieval of a state of the service, and retrieval of a link to the service;

and dynamically generating a response to execution of the action.

19. The medium of claim 18, wherein the dynamically generated response is one of a status for the service and a log link for a service log associated with the service name.

20. The medium of claim 18, wherein the service disruption notification is received by both a user and an outage tool.

* * * * *